United States Patent
McConnell

(10) Patent No.: US 6,701,227 B2
(45) Date of Patent: Mar. 2, 2004

(54) AVIONICS SYSTEM

(76) Inventor: R. Perry McConnell, 9001 Forest Crossing, Suite F, The Woodlands, TX (US) 77381

( * ) Notice: Subject to any disclaimer, the term of this patent is extended or adjusted under 35 U.S.C. 154(b) by 0 days.

(21) Appl. No.: 10/192,868

(22) Filed: Jul. 10, 2002

(65) Prior Publication Data

US 2004/0010353 A1 Jan. 15, 2004

(51) Int. Cl.[7] .................................................. B64C 7/00
(52) U.S. Cl. .............................. 701/3; 701/14; 340/961
(58) Field of Search ................................ 701/3, 14, 17, 701/10, 226, 4; 340/961, 500, 945

(56) References Cited

U.S. PATENT DOCUMENTS 6,038,498 A * 3/2000 Briffe et al. ................... 701/3
6,076,042 A * 6/2000 Tognazzini ................ 701/301

* cited by examiner

*Primary Examiner*—Marthe Y. Marc-Coleman
(74) *Attorney, Agent, or Firm*—O'Neil & McConnell, PLLC; R. Perry McConnell

(57) ABSTRACT

An avionics system for providing information to pilots provides a communications bus, allowing each instrument in communication with the bus to access information from a plurality of sensors. Software based instrumentation and the ability to remove and insert computation units in communication with the bus provide the ability to change instrumentation. Interchangeable display units provide additional redundancy in the event of display unit failure.

20 Claims, 4 Drawing Sheets

AVIONICS SYSTEM

FIELD OF THE INVENTION

The invention concerns the field of avionics, specifically the providing of information to a pilot or flight crew and, potentially, to ground-based communications regarding the status of an aircraft.

BACKGROUND OF THE INVENTION

Avionics devices generally available in modern aircraft range from instruments which had their technological origins in the first half of the twentieth century to more advanced, electronic- and computer-operated units. Regardless of their level of technological advancement, avionics devices characteristically accept information or data from a source and provide that information to the pilot either visually in raw form or in a translated (e.g., graphical) format that is more readily meaningful, or via a combination of visual and audio information.

These devices have historically been single-function units. That is, an avionics device will usually provide a single major piece of information. For example, a directional gyro indicates magnetic course, and tells the pilot nothing about airspeed, engine rpm, or oil temperature. Multi-function avionics devices were historically limited to a small set of functions, for example, a turn-and-bank coordinator provides a turn indicator and a slip-and-skid indicator.

One of the historical purposes served by an array of discrete devices is redundancy and, thus, overall systems reliability. For example, if the gyro in an artificial horizon failed in flight, that failure would not affect the operation of the airspeed indicator, the turn-and-bank coordinator, or the directional gyro, thus leaving the pilot without the artificial horizon but with an adequate instrument panel.

A further purpose in such discrete devices has been compensating for the variations in instruments needed for various airplanes. For example, the airspeed indicator for an aircraft may bear markings to indicate maximum flap extension speed, maneuvering speed, and never exceed speed. Because these speeds vary for different aircraft, combining other expensive instruments with the airspeed indicator would require manufacturing a variety of different models of the instrument package just to provide varied airspeed indications needed for various aircraft. Thus the cost of manufacturing and keeping inventory would rise, as would the cost to the aircraft owner to replace a device when only one component had failed.

The advent of reliable microelectronics and computers, as well as solid-state "gyroscopes" has changed the available instrumentation options. Electronic flight information systems, or "EFIS," now combine a group of flight data displays into one or more displays for the pilot. These systems often combine information such as an artificial horizon display, directional gyro display, airspeed indicator, and vertical speed indicator into a single graphical display. Because they use electronic processors, these units can provide programmable indicators, such as for airspeed limitations, and can thus be programmed for use in a wide variety of airplanes.

However, EFIS does not eliminate the need for some redundancy for the purpose of safety. In a single-display EFIS, the failure of one critical component, such as a power-supply connection to the display, can eliminate all of the information the EFIS normally displays. Thus, safety concerns dictate that the airplane be equipped with some redundant, discrete instrumentation, which is expensive, or that the EFIS be manufactured to extreme reliability standards, which is also expensive. Costs for high-quality, FAA-approved EFIS units can be on the order of $50,000, and beyond the financial reach of many small airplane pilots. Indeed, the cost of such a unit exceeds the total value of many small airplanes.

Avionics devices also must be connected to an airplane to be of use. Depending on the avionics device, such connections may include: (1) condition inputs, such as ram- or static-air pressure, outside air temperature, oil pressure, and the like; (2) signal inputs, such as antenna feeds for communications and navigation radios; and (3) controls from the pilot, such as frequency changes or changes to trim settings. Further, a device may require additional connections, supplying such needs as power to operate, power to operate built-in lighting (usually from a dimmer circuit), or a source of positive or negative (vacuum) air pressure. Power connections must often be routed through switches and circuit breakers. Thus, the "behind-the-panel" wiring and connections for an airplanes avionics is complicated, often messy in appearance, and expensive to repair or replace.

Further, avionics devices cannot always be flexibly arranged on an aircraft panel. Once the original holes are set in the panel, instrument positions are somewhat fixed. Even though many devices conform to "standard" sizes, a 3½-inch device cannot be moved into a 2¼-inch instrument hole, even if wiring and other connections could be moved. Similarly, radio widths and heights follow "standards" which change with function, the manufacturer, and the ever-advancing level of technology, which allows smaller devices to do more than their predecessors.

Accordingly, it is desirable to provide an avionics system which simultaneously overcomes many of the limitations of the current state of the art. It is an object of the present invention to provide a device and method for providing avionics information to a pilot which is reliable, allows continued operation in the event of the failure of one, or even multiple, components, reduces interconnection complexity, allows easy replacement or upgrade of individual components, and allows for flexibility in display arrangement.

It is a further object of this invention to reduce manufacturing costs, and thus retail costs, for avionics devices, and to allow greater flexibility in selecting avionics components for installation in a particular airplane.

SUMMARY OF THE INVENTION

The present invention comprises an information bus, which is intended to provide a set or subset of sensor information to each avionics device. For purposes of this invention, "sensor" includes all forms of devices intended to collect information from the environment, or from the airplane itself. Thus, "sensor," as used herein, includes, but is not limited to: pilot tubes; static air pressure sensors; fuel gauges; oil pressure sensors; oil temperature sensors; water pressure sensors; water temperature sensors fuel pressure sensors; fuel, water, or oil flow sensors; thermocouples; cylinder head temperature sensors; exhaust gas temperature sensors; engine rotation rate sensors; electrical voltage sensors; electrical current sensors; trim position sensors; antennas, such as communication, navigation, and transponder antennas; air or vacuum pressure sensors; and gyroscopic or rotational position sensors. As those of skill in the art will recognize, not all of these sensors will exist on every airplane. Further, it may be desirable to provide redundancy for some sensors, such as gyroscopes, so that all flight instruments which depend on gyroscopic information from the bus will not become non-functional as the result of failure of a single gyroscope.

In many applications it will be desirable to digitize information which is collected in analog form by a sensor, and making the digitized information available on the bus. For example, it may be desirable to use a pressure transducer to create an electronic signal corresponding to the ram air pressure, and providing the electronic signal to the bus. However, doing so is not critical, although digitizing such information will likely be the most cost-efficient approach.

Further, separate information lines are not required on the bus for every sensor output; such signals may be multiplexed if desired. Moreover, not all of the sensor information needs to be available at every location on the bus. For example, it may be desirable to separate one section of the bus carrying radio signals from another section, to prevent interference with radio operations from other devices, or vice versa. Alternatively, antenna feeds may be removed from the bus altogether, and directed solely to computation devices which perform appropriate communication or navigation radio functions.

Computation devices are interconnectable with the bus in a manner which allows information to pass from the bus to each computation device, and vice versa. Each computation device generates secondary information corresponding to one or more avionics functions. Thus, as used herein, "computation device" means a device which performs an avionics function based on an available piece or set of information. Accordingly, as used herein, computation devices include devices which perform the function of attitude instruments, engine instruments, communications and navigation radios, or other instruments and indicators, and which provide information to the pilot or flight crew or allow or assist the pilot or flight crew to perform their functions.

Those of skill in the art will recognize that multiple avionics functions can be performed by a single computation device. Although some functions will doubtlessly be so combined in various instantiations of this invention to allow for more efficient displays, this invention also provides for multiple individual instruments, allowing greater flexibility in the event of failure, lower repair cost, and greater flexibility for the aircraft owner in selecting which avionics instruments to install in his airplane.

The computation devices comprise printed circuit boards, similar to those found in desktop computers. Accordingly, each printed circuit board can be connected to the information bus by inserting a tabbed edge into a socket connected to the information bus, thereby allowing individual computation devices to be quickly installed, replaced, or removed from the airplane. Thus, new avionics devices can be quickly added, failed components replaced, or upgraded devices quickly installed. Those of skill in the art will recognize that it is desirable to mount the information bus in a rack or similar unit, to allow the use of edge guides and locking devices to insure that the printed circuit boards are correctly positioned, secured in place, and protected from damage due to vibration or other movement of the aircraft.

In the preferred embodiment, a secondary bus will comprise power supply circuitry, and the printed circuit boards will comprise edge connectors configured to attach the boards to the appropriate power circuit. In this way, switching circuitry, such as that used to turn power on or off to devices attached to the avionics master power switch, can be greatly simplified.

The secondary information generated by the computation devices is presented to the pilot or flight deck crew by electronically generating a visual display on a display device in analog, digital, or a combined analog-digital format. The generation of the visual display information is preferably transmitted to the display device via a standardized cable. As used herein, a "standardized cable" is one which has the same pin-out specification as other such cables in the avionics system. Thus, if a display unit for a more critical flight instrument fails, the standardized cables can be exchanged between the failed display unit and a display unit which is being used for a less critical flight instrument, thus salvaging the function of the more needed flight instrument.

The display units will preferably be liquid crystal displays, and will also preferably be TFT displays or of equal or better resolution and clarity. Such displays provide low power usage, clarity, visibility in direct sunlight conditions, and can also provide color capability. However, other display types can suffice for use as display units as contemplated in this invention.

As with any avionics system, there will be some variation in actual display sizes used. For example, radio functions are more likely to be displayed on a rectangular display, with the longer axis disposed horizontally, if only to mimic the current radio faceplates to which most pilots are accustomed. Conversely, standard flight instruments such as an artificial horizon or directional gyro are more likely to be displayed on a square or rectangular display which mimics a standard 3½-inch device. Flight instruments for which information can be displayed on a smaller scale, such as fuel gauges or trim tab position indicators, could be displayed on a square or rectangular display which mimics a 2¼-inch device, to save valuable panel space. However, the use of standardized cables means that information which is displayable at 2¼-inches is also displayable at 3½-inches, and, within readability limits, vice versa. Further, those of skill in the art will recognize that, because the display units can transmit information via the standardized cable as well as receiving it, information regarding the display size can be provided automatically, and the display generator can adjust under software control to the actual display size in use. Even if three sizes of display units are used, this invention allows the efficient replacement of any one display unit, in the event of failure, by maintaining a stock of only three spares, one for each size in use.

Because the display units involved will be relatively flat and lightweight, they can be readily positioned on the avionics panel by means of set screws. Thus, a matrix of threaded holes set into an avionics panel can allow rapid and easy repositioning of any display unit, so that the pilot or flight crew will no longer be locked in to whatever panel layout was initially drilled. Further, the addition or removal of any avionics device will no longer require the creation of a new hole in the panel or open gap therein. Given sufficiently strong adhesives to secure the appropriate tape, the display units can alternatively be affixed to the avionics panel with a tape adhesive, such as VELCRO®, allowing the rapid repositioning of any display unit.

In the preferred embodiment, the display units further comprise touch screen capability, so that displays can be generated which allow the pilot or flight crew to adjust the setting of the flight instrument. Thus, via direct electronic control, the pilot or flight crew can select functions displayed on the display unit to, for example, change frequencies on a communications or navigation radio, adjust the directional gyro display for drift, or adjust the altimeter setting. This information, transmitted via the standardized cable from the display unit to the computation device, can be used to update the state of the computation device and thus the display unit. Further, this information can be provided to the bus through the use of additional data lines, allowing every computation device on the bus effectively simultaneous access to the information provided by the pilot or flight crew.

As those of skill in the art will recognize, instead of touch screens, the display units can be supplemented as necessary with hardware such as selector knobs, buttons, and the like without departing from this invention. However, doing so imposes additional penalties of cost, incompatibility, and loss of redundancy which are to be avoided, if possible.

It will further be understood that a computation device may have links to multiple display units. Such situations will necessarily be the case if a computation device is designed to perform a function such as that provided by a traditional navigation radio, which would require one display unit to serve as the traditional radio faceplate and a second display unit to serve as the indicator. Further, a multi-function computation device might provide secondary information to multiple display units, rather than combining all of the displays into a single unit.

This invention overcomes many of the problems inherent with current avionics systems. The modularity involved allows various avionics to be quickly added or removed from an airplane without affecting the functioning of any other avionics function. Further, upgraded radios, global positioning systems, or other avionics can be installed without paying for, or installing, new displays. Displays can be moved, removed, replaced, or repaired without the cost of an attached avionics system. Further, the ready availability of flight sensor data on the bus allows for advances in flight safety, such as the ability to automatically transmit encoded forms of all available sensor data in an emergency. Thus, this invention, in conjunction with the appropriate software and hardware, could provide a "poor man's black box" for aviation, and allow accident investigators unprecedented access to enhanced information.

DETAILED DESCRIPTION

Figure 1:
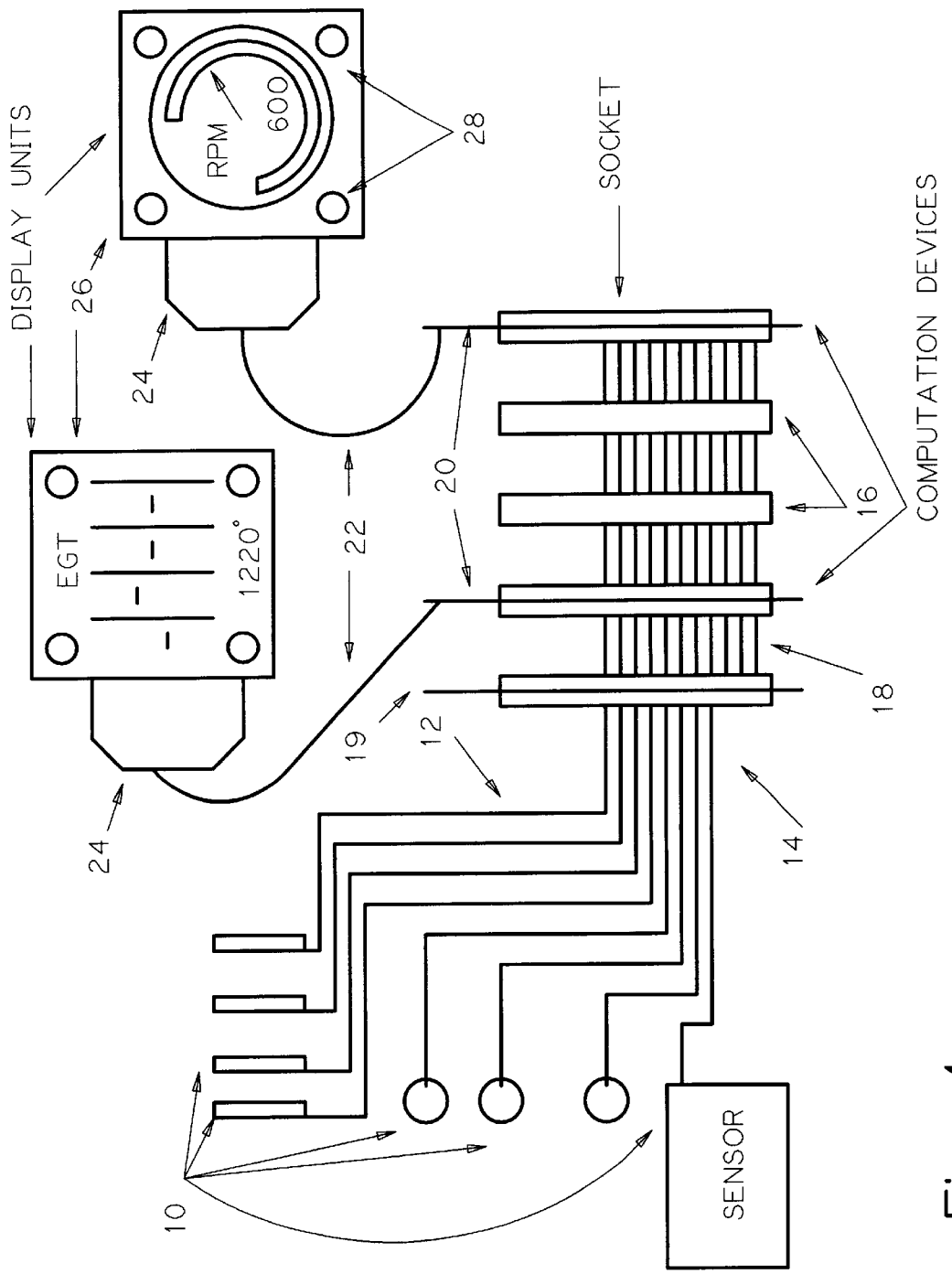
FIG. 1 is a schematic view of one embodiment of the invention

Referring to FIG. 1, one embodiment of the invention is shown. Sensors 10 are coupled via information lines 12 to a initial bus 14. The sensors 10 of the preferred embodiment include at least one axis of solid-state gyroscopic information, and preferably would include three axes of such information. In the preferred embodiment, raw data from the sensors 10 is connected to a device 19 comprising a digitizer, which provides digitized values of the raw data to the bus 18. Alternatively, some or all of the sensors 10 may incorporate such digitizers, or such digitization may occur for the data from one or more of the sensors 10 by using discrete digitizers, or some or all of the raw data, especially that from such devices as ram or static air intakes or radio antennas, may be carried on the bus 18 in raw form. The device 19 may also comprise a multiplexer, to allow at least some of the data lines in the bus 18 to carry information from a plurality of sensors 10. Regardless of such variations, bus 18 provides information from a plurality of sensors to a plurality of connectors, such as sockets 16.

As will be recognized from this schematic view, the number of sensors 10, the number of information lines in the initial bus 14, the number of information lines in the bus 18, and the number of connectors, such as sockets 16 which will actually be used is not reflected in the drawing. Further, in the preferred embodiment, the design of the bus 18 will include information lines for devices which may not exist in a particular airplane. For example, the specification for the bus 18 may include information lines for use with cylinder head temperature (CHT) sensors, even though such sensors may not be installed on every airplane. However, such a configuration allows such sensors to be easily installed later by connecting them to the appropriate inputs to the bus 18, and allows a CHT "gauge" to be quickly installed by plugging an appropriate computation device 20 into an available socket 16. Similarly, the number of sockets 16 which will be installed will vary with both the initial requirements of the aircraft and the need for future expansion. It is likely that sockets 16 will be available in pre-manufactured groups of five, ten, or some other convenient number, and connected to the existing bus 18 via bus expanders, e.g., cables.

Figure 4:
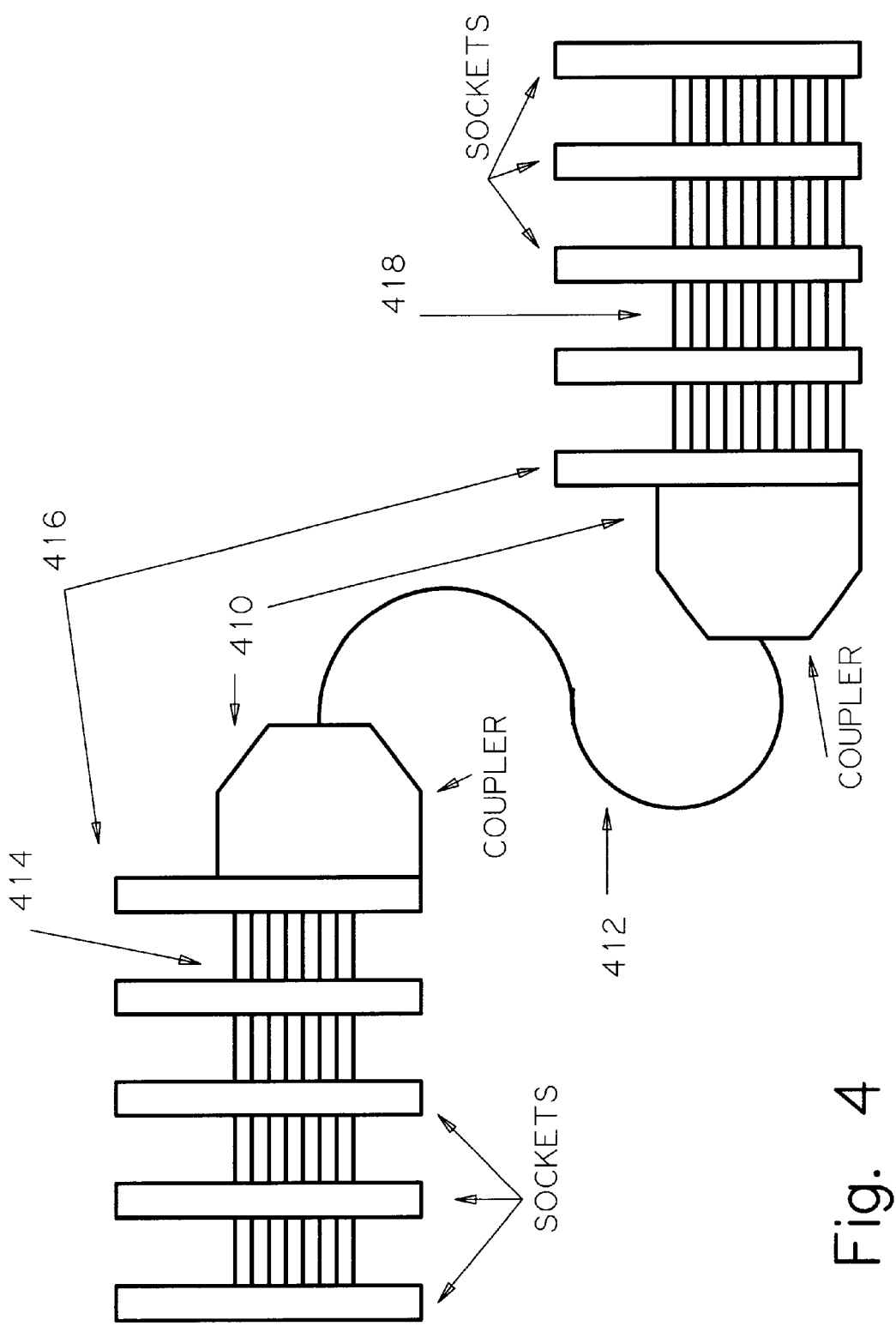
FIG. 4 is a schematic view of an alternative embodiment of a bus of the invention.

Referring to FIG. 4, one example of such an expansion arrangement is shown schematically. First and second bus sections 414, 418 comprising sockets 416 are interconnected to each other via couplers 410 and cable 412. Also shown by example in FIG. 4 is that second bus section 418 comprises more information lines than does first bus section 414. Thus, computation devices attached to second bus section 418 may have available the information from first bus section 414, as well as additional information. Such a configuration may be used when it is desirable to isolate some sensor information, such as antenna connections which may create radio-frequency interference with some computation devices.

Referring again to FIG. 1, computation devices 20 perform their functions by obtaining information they need from sensors 10 via the bus 18 and utilizing hardware, software, or a combination thereof to generate secondary information and create an appropriate visual display. The visual display information is transmitted to display units 26 via standardized cables 22, which can be connected to the display units 26 by couplers 24. The display units 26, which are preferably TFT liquid crystal displays, can be used to display the secondary information in graphical, digital, or a combination of graphical and digital form. Those of skill in the art will recognize that the displays depicted in FIG. 1 are for illustrative purposes only, and are not limitations on the possible avionics functions which can be performed by computation devices of this invention. As will also be recognized by those of skill in the art, the secondary information may include raw data from sensors 10 which has been put in displayable form.

The display units 26 may be affixed to an avionics panel by use of set screws 28, or by other appropriate attachment means.

Those of skill in the art will recognize that the generation of the visual display based on the secondary information generated by computation devices 20 can occur in a separate location. That is, the visual display generators do not have to be integrated on the same printed circuit boards as the computation devices 20. However, such an arrangement would require additional cabling and circuitry, and would introduce unnecessary inefficiencies to the system.

Figure 2:
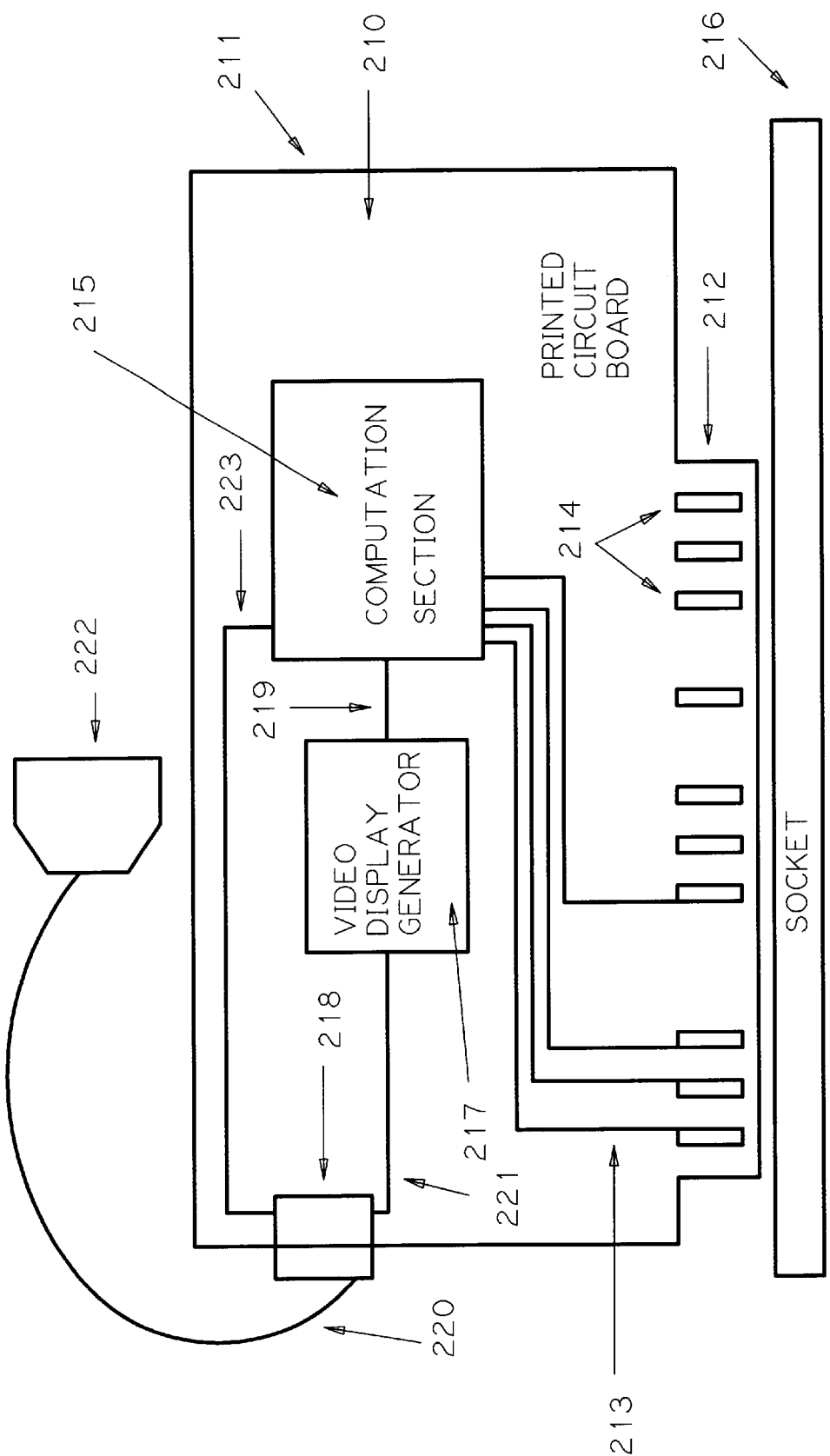
FIG. 2 is a schematic view of one embodiment of the connections between the bus, computation devices, and display units.

Referring to FIG. 2, an embodiment of a computation device 211 is schematically shown. A printed circuit board 210 comprises an edge-tab connector 212 which is insertable in socket 216. Information from the bus (not shown) is obtained electronically by conductive fingers 214. Those of skill in the art will recognize that fingers 214 may be printed on both sides of the printed circuit board 210 and will provide selective connections to those information lines in the bus which are needed for the function to be performed by the computation device 211. Fingers 214 are connected to the computational section 215 of the computation device 211 via connectors 213 (some of which are omitted for clarity). The computation section 215 is shown in schematic form only, and may comprise one or more discrete devices utilizing hardware, software, or a combination thereof to perform an avionics function utilizing the information obtained from the bus via fingers 214. Secondary information generated by the computation section 215 is transmitted via a first data pathway 219 to a video display generator 217, which in turn sends control signals for a display unit (not shown) via a second data pathway 221 to first coupler 218, and thence to standardized cable 220 and second coupler 222. In the preferred embodiment, the display unit (not shown) will comprise touch-screen capability, so that information input by the pilot or flight crew can return via second coupler 222, standardized cable 220, first coupler 218, and third data pathway 223 to the computation section 215. Thus, the avionics function performed by the computation device 211 can utilize both data from the airplane and from the pilot or flight crew.

In the event of a sensor failure and corresponding loss of data from the bus, the computation section 215 can continue to perform as much of its normal function as possible, while simultaneously providing the pilot or flight crew with diagnostic information regarding what portion of its raw data is missing. Thus, the system has the ability to self-diagnose and aid in repairs when a component fails.

Figure 3:
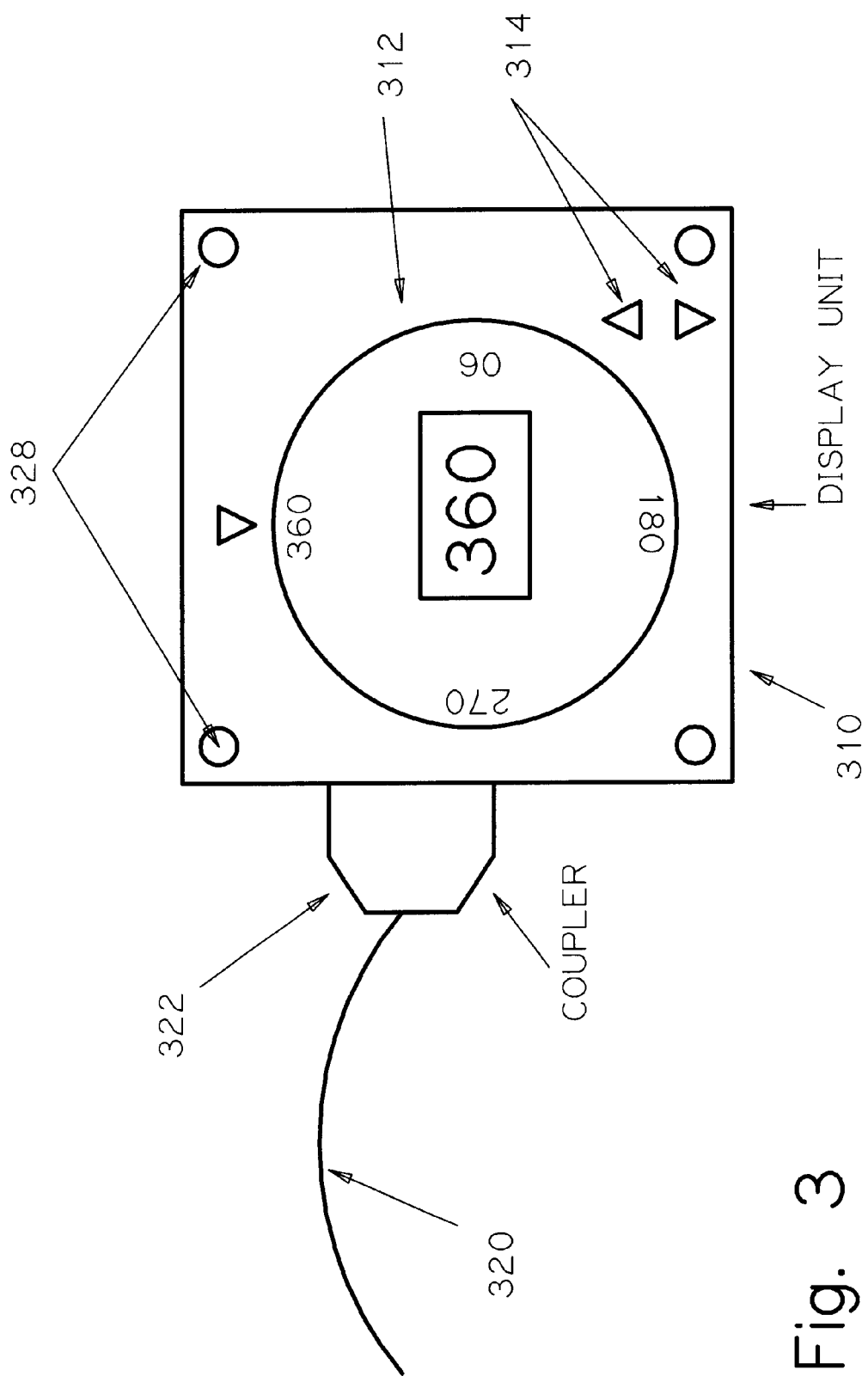
FIG. 3 is a schematic view of one embodiment of a display unit.

Referring to FIG. 3, an embodiment of a display unit is shown. Standardized cable 320 is attached to the display unit 310 via coupler 322. Set screws 328 may be used to securely position the display unit 310 on an avionics panel (not shown). Graphical and digital information received from a computation device (not shown) is displayed on the face of the display 312. Additionally, in the preferred embodiment, the display unit 310 comprises touch screen capability, allowing "buttons" 314 for input from the pilot or flight crew to be displayed. In the example shown in FIG. 3, a "directional gyro" compass is displayed in its traditional (that is, standard discrete instrument) format, with an additional digital display showing current indicated heading at the center. "Buttons" 314 allow the pilot or flight crew to adjust the current reading of the compass to agree with the airplane's magnetic compass. As those of skill in the art will recognize, the ability to generate such displays under software control allows the display to incorporate "buttons" appropriate to the avionics function being displayed, such as radio frequency control inputs for radio displays, or barometric pressure adjustment inputs for altimeter displays.

In accordance with the above, this invention provides flexibility, built-in redundancy capability, and the capacity to provide lower-cost avionics of equivalent or better quality than currently available products to the end user. Those of skill in the art will recognize that the above examples are illustrative and not limiting, and that variations can be constructed without departing from the spirit of the invention.

I claim:

1. A method of providing avionics information to a pilot, comprising:

providing information from a plurality of sensors to a bus;

providing a plurality of releasable connections to said bus;

connecting a plurality of computation units to said bus via a plurality of said connections;

using said computation units to utilize information from the bus to generate a plurality of secondary information sets; and displaying representations of said secondary information sets on a plurality of connectably interchangeable display units, wherein the information displayed on at least one of said display units includes information not displayed on at least one other display unit.

2. The method of claim 1, additionally comprising the steps of:

accepting data input from the pilot; and modifying a set of secondary information utilizing the data input by the pilot.

3. The method of claim 1, wherein the step of displaying representations of said secondary information sets on a plurality of connectably interchangeable display units additionally comprises the step of displaying some information in color.

4. The method of claim 1, wherein the step of displaying representations of said secondary information sets on a plurality of connectably interchangeable display units includes the step of displaying at least one of said secondary information sets on an LCD display.

5. The method of claim 1, additionally comprising the step of transmitting information selected from said bus via a radio to a receiver.

6. The method of claim 1, additionally comprising the step of:

expanding said bus to provide additional releasable connections.

7. The method of claim 1, additionally comprising the step of:

selectively providing power to one of said computation units via said bus.

8. The method of claim 1, additionally comprising the step of removably attaching said display units to the face of an aircraft panel.

9. The method of claim 1, additionally comprising the steps of:

disconnecting a first display unit from a first computation device;

disconnecting a second display unit from a second computation device; and connecting said first display unit to said second computation device.

10. The method of claim 1, additionally comprising the step of selectively coupling information from a sub-set of the plurality of sensors to only a sub-set of said releasable connectors.

11. A device for providing avionics information to a pilot, comprising a bus, wherein said bus provides information from a plurality of sensors;

a plurality of releasable connectors coupled to said bus;

a plurality of computation devices in informational communication with said bus via a plurality of said connectors, wherein said computation devices utilize selected information from said bus to formulate displayable secondary information, and a plurality of connectably interchangeable display units in informational communication with a plurality of said computation devices, wherein said display units display formulated secondary information, and wherein at least one of said display units displays information not displayed on another of said display units.

12. The device of claim 11, wherein at least one of said display units comprises an interface allowing a pilot to input information to at least one of said computation devices.

13. The device of claim 12, wherein said interface comprises a touch screen interface.

14. The device of claim 11, wherein at least one of said display units is an LCD display.

15. The device of claim 11, additionally comprising:

a bus extender in informational communication with said bus, wherein said bus extender comprises releasable connectors coupled to said bus.

16. The device of claim 11, wherein said bus additionally comprises power supply lines, wherein said computation units can selectively couple to said power supply lines.

17. The device of claim 11, wherein said display units are removably attachable to the face of an aircraft panel.

18. The device of claim 11, wherein information from a sub-set of the plurality of sensors is selectively coupled to only a sub-set of said releasable connectors.

19. A method of providing avionics information to a pilot, comprising:

providing information from a plurality of sensors to a bus;

using information from the bus to generate a plurality of secondary information sets;

displaying representations of said secondary information sets on a plurality of connectably interchangeable display units, wherein the information displayed on at least one of said display units includes information not displayed on at least one other display unit;

accepting data input from the pilot; and modifying a set of secondary information utilizing the data input by the pilot.

20. A method of providing avionics information to a pilot, comprising:

providing information from a plurality of sensors to a bus;

using information from the bus to generate a plurality of secondary information sets;

displaying representations of said secondary information sets on a plurality of connectably interchangeable display units, wherein the information displayed on at least one of said display units includes information not displayed on at least one other display unit; and transmitting information selected from said bus via a radio to a receiver.

* * * * *